Aug. 26, 1930.  A. H. NEULAND  1,773,842
POWER CONTROL SYSTEM
Filed May 27, 1925  2 Sheets-Sheet 1
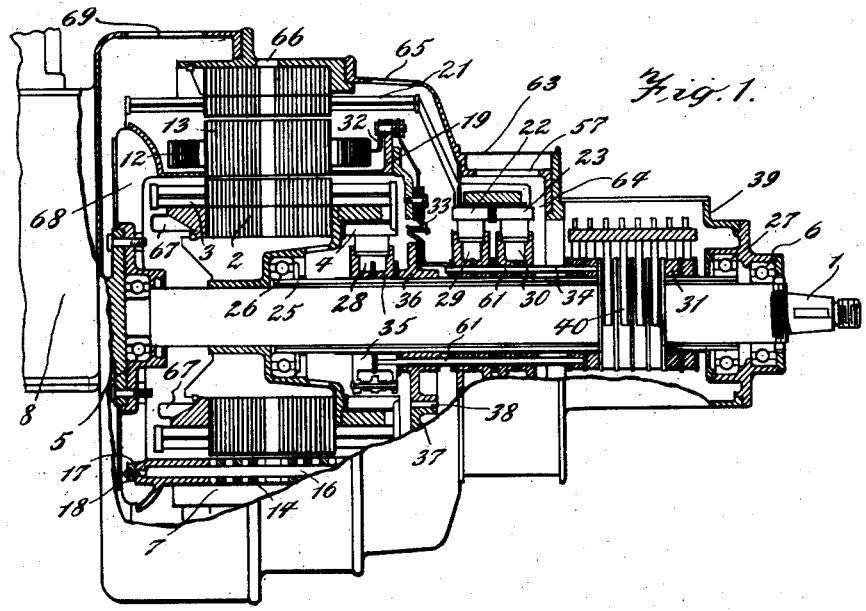
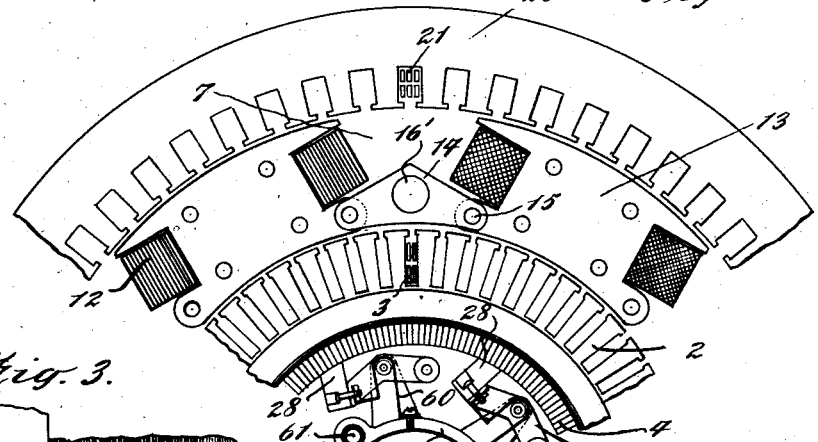
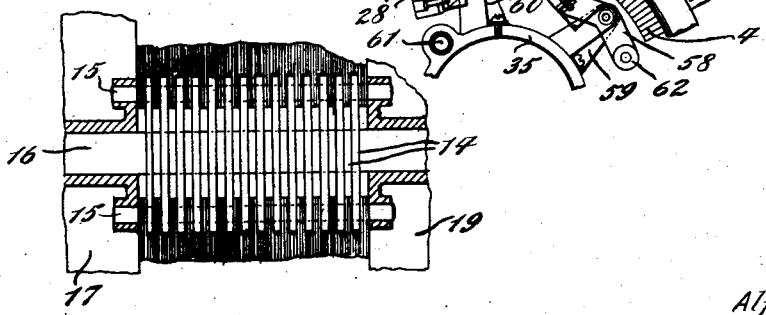
INVENTOR
Alfons H. Neuland
BY
ATTORNEYS Aug. 26, 1930.　　A. H. NEULAND　　1,773,842
POWER CONTROL SYSTEM
Filed May 27, 1925　　2 Sheets-Sheet 2
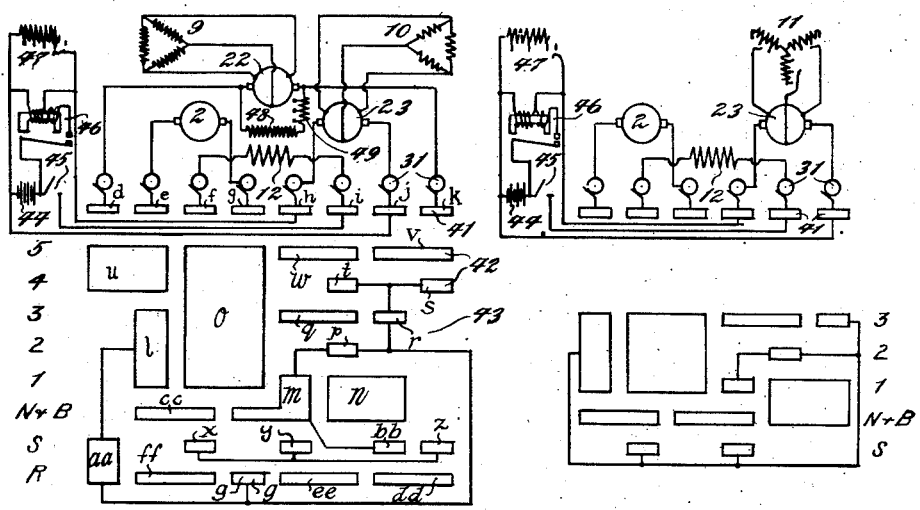
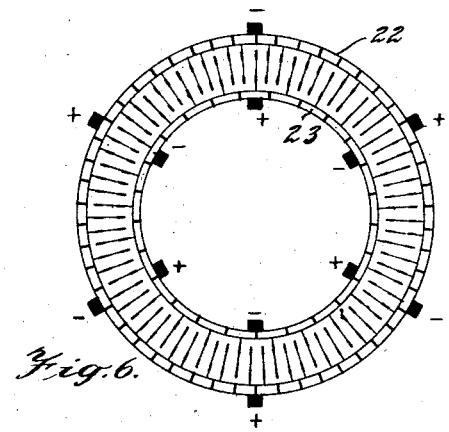
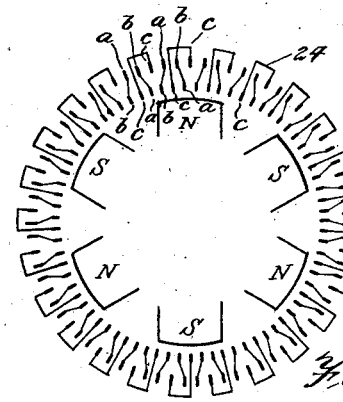
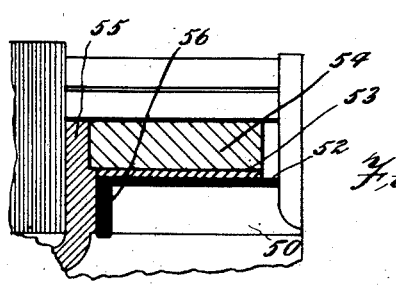
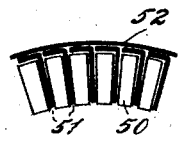
INVENTOR
Alfons H. Neuland
BY
ATTORNEYS Patented Aug. 26, 1930

1,773,842

UNITED STATES PATENT OFFICE

ALFONS H. NEULAND, OF IRVINGTON, NEW JERSEY, ASSIGNOR TO ELECTRO-MOBILE CORPORATION, OF IRVINGTON, NEW JERSEY

POWER CONTROL SYSTEM

Application filed May 27, 1925. Serial No. 33,081.

My invention relates to electric systems and is intended for driving motor vehicles, railway cars, locomotives and other machinery deriving their power from an internal combustion engine or from electric mains having a constant frequency or potential, or from both.

One object of my invention, is to provide a system which is capable of changing a quantity of mechanical power of given torque and speed from an internal combustion engine or other mechanical power source, or a given quantity of electric power supplied from mains at a constant potential or frequency, into flexible power of wide range, that is, to a high torque at low speeds diminishing as the speed is increased to a high rate. Another object is to have a multiplicity of speed and torque adjustments at each of which a change in speed will be accompanied by a correspondingly increased or decreased torque. Another object is to obtain a double speed and torque range, of the driven element; one below the driver producing a speed less than the driver and a torque greater than that of the driver; and one above the driver at a speed greater than the driver and at a torque less than that of the driver torque. Another object is to obtain a powerful reverse torque. Another object is to provide for an efficient apparatus of light weight and high power. Another object is to have the system perform a number of auxiliary functions such as the starting of the prime mover or the bringing up to synchronous speed of one element of the system, charging of the starting battery, and regenerative and dynamic braking of the vehicle or machine to be driven. Still other objects and advantages of my invention will appear from the following specification in which I have described my electric-system as adapted to be driven by an internal combustion engine and from three phase electric supply mains, although it is to be understood that any other suitable form of prime mover may be employed and that the system may be used to drive a motor vehicle, locomotive, ship, elevator, or any other machine requiring the characteristics of my system.

It is well recognized that internal combustion engines develop a substantially constant torque and operate at their greatest economy when delivering their normal torque at a moderate speed. However, the best operation of motor vehicles, locomotives, etc. requires a greatly increased torque at start to provide good acceleration, and in order to negotiate grades. Similar conditions prevail in electric locomotives fed by generating stations and supplied particularly by alternating current of constant frequency and voltage. It has been the practice in Diesel locomotives to generate electric power in a dynamo and feed it into a plurality of motors for the purposes of control. This double change of power involves considerable losses, a multiplicity of electric units and a good deal of weight. Electric locomotives operated by alternating current motors of the commutating type, also leave much to be desired on account of the plurality of motors needed and particularly on account of the difficulty and the losses involved in commutating alternating currents.

My invention overcomes these difficulties in that I provide for commutation of direct current in a system of unitary construction having a single magnetic structure in which a portion of the power is directly transferred from one member to the other and where only that portion of the energy which represents the difference in speed to be obtained is converted into electrical energy and utilized to increase either the torque or the speed of the driven element. The advantages thus obtained are many fold. As compared with the multiple unit systems in use, the iron and copper losses are reduced substantially one half. The commutation losses are also greatly reduced. Also the number of windings, commutators and brush sets are fewer and the electrical energy to be handled is greatly reduced, and consequently a much lower current or voltage is handled at the brushes with better commutating characteristics and reduced losses.

My system comprises three major parts, the field member rotated by an internal combustion engine, a motor or by a source of electric power fed into my system, a rotatable armature driving the load and facing the field poles on one side and a stationary armature facing the field poles on the other side so that a common magnetic flux traverses the elements. The operation of the system is based upon the generation of relative potentials in two armatures of the system and controlling means for changing the strength and direction of the relative potentials to the end that in one position of the controller an inferior stator potential opposes a superior armature potential resulting in a reduced armature speed and a reenforcing torque upon the field by the reversed stator winding with a consequent increased torque by the field upon the armature; in another position of the controller the armature is simply clutched by the field, the field transferring its full torque at practically its own speed constituting direct drive unaided by the stator; in still another position an inferior stator potential cooperates with a superior armature potential and causes the armature to rotate at a speed higher than that of the driving field; and in other positions of the controller to increase the stator potential and so still further increase the armature speed. Other positions of the controller serve to reverse the rotation of the armature by production of a superior stator potential fed to the reversed armature producing an opposing inferior potential. Still other positions of the controller serve to rotate the field by the rotation of the armature from an auxiliary battery.

My invention also comprehends numerous auxiliary functions and various features of electrical arrangement and mechanical construction, details and arrangements of parts, as will hereinafter more fully appear. I shall now describe the illustrated embodiment of my invention and shall thereafter point out my invention in claims:

Fig. 1 is a partial longitudinal section and a partial side elevation of an electric system embodying my invention;

Fig. 2 is a segment of a transverse section, showing the magnetic structure, the construction of the field poles and the links tying them with one another and showing the counterbalanced brushes;

Fig. 3 is a fragment of the field poles and spider rings showing the manner in which the rods tie the links with the pole pieces and are held in rigid alignment with the spider and ring;

Fig. 4 is a diagram of the electric circuits including the controller contacts by means of which connections are made corresponding to the various functions;

Fig. 5 is a diagram of electric circuits of a modified form of my invention;

Fig. 6 diagrammatically illustrates the end connections, commutators, leads and brushes of a multiple voltage armature winding employed in connection with one embodiment of my invention;

Fig. 7 diagrammatically represents the other ends of the armature winding shown in Fig. 6 and particularly the manner in which the ends of the winding are connected in order to secure two separate windings of different voltage ratios;

Fig. 8 represents a longitudinal section of the internal commutator and particularly its location within the end connections of the armature winding;

Fig. 9 illustrates the method used of insulating the commutator bars from one another and preventing the mica plates from shifting beyond the commutating surface.

The electric system which I have selected for illustration in the drawings is adapted to have its armature shaft 1 connected to any load such as the driving wheels of a locomotive or motor vehicle, on which is rigidly secured the driven or inner armature 2 provided with an armature winding 3 connected to an internal commutator 4. The armature shaft is rotatably mounted in the ball bearings 5 and 6. The driving or intermediate element 7 surrounds the inner armature and is rotated by the internal combustion engine 8 or by electric power fed into the machine by the alternating current supply mains 9, 10, and 11. The field element is provided with field coils 12 surrounding the laminated pole pieces 13. The field system is constructed for high speed operation, the pole pieces being tied to each other by the non-magnetic links 14 and the tying bolts 15; in order to permit a substantial core length and small diameter of the machine the links are provided with holes 16' in which are embedded the aligning rods 16; these rods protrude beyond the ends of the core and are force fitted into holes of the spider 17 and secured thereto by means of the nuts 18. On the other side of the core the protruding bolts are embedded in the aligning ring 19. By these means a very rigid assembly is secured and one well able to withstand the centrifugal forces at high speeds.

The field element is surrounded on its outer face by the stationary armature or stator element 20 provided with a winding 21 connected to the commutators 22 and 23. The stationary winding is so arranged that a multiple of voltage ratios can be obtained and is more particularly shown in Figs. 6 and 7 where a six pole armature with only twenty-five slots is illustrated. The winding is particularly intended to carry heavy currents enabling the use of strip or bar copper with few strips per slot, in the illustration six strips per slot being used, three in the bottom layer and three in the top layer making seventy-five conductors in the top layer and seventy-five conductors in the bottom layer.

Fifty conductors from each of these seventy-five make up the circuit for one winding connected to the commutator 22, and the remaining twenty-five conductors from each of the seventy-five constitute an entirely independent winding connected to the commutator 23. The two windings are not only independent of one another but have a voltage ratio in this case of 2:1 and enable me to get a triple voltage ratio combination. Assuming the twenty-five conductor winding to be one hundred volts the fifty conductor winding will then have two hundred volts and the two windings when connected in series three hundred volts. It is necessary in order to obtain this combination to provide connectors 24 in order that the ends of some of the conductors in the bottom row may connect with ends of the conductors in the top row so as to skip adjacent ends. In Fig. 7 conductors $c$ belong to the low tension winding and $a$—$b$ to the high tension winding. The connecting pitch for the $c$ winding is $8 \times 3 + 1 = 25$. The connecting pitch for the $a$—$b$ winding is $17 \times 3 - 1 = 50$. The winding pitch in this instance will be 4 and the connecting pitch on the other side of the armature will be 24. From Fig. 6 it will be seen that the commutator can be connected to the side of the armature with the uniform connecting pitch and that the commutator leads need not cross one another, although in some instances the commutators may be connected to the side shown in Fig. 7 or one commutator can be connected to each side of the armature. It will be noted in Fig. 6 that in the illustrated embodiment a brush on one commutator coinciding angularly with a brush on the other commutator will have opposite polarity.

A sleeve or tubing 25 surrounds the armature shaft and is journaled in the ball bearings 26 and 27. This sleeve carries the rotating armature brushes 28 contacting with the commutator 4 of the internal armature and the brushes 29 and 30 wiping the commutators 22 and 23 of the external armature. The tube also carries eight slip rings 31 to two of which are connected the two field leads 32 through the contactor 33 and the connecting lead 34. The other six rings are connected to the three sets of brush-carrying rings 35. The sleeve also carries the aligning flange 36 which slidingly engages the field flange 37 and is keyed thereto by the pin 38 so that the sleeve to which are secured the brush rigs and slip rings rotates with the field and at the same time keeps the field in rigid alignment and prevents distortion of the air gaps.

It will be seen that the brush rig and sleeve can be easily removed for replacement of brushes or inspection by the removal of the ring casing 39. The slip ring brushes 40 make contact with the rings and are connected to the controller contact fingers 41.

In Fig. 4, I have shown the contact fingers making various connections between the windings by means of the contacts 42 on the drum face 43 establishing connections for five forward speed and torque adjustments, reverse, starting, neutral and brake.

With the controller in position 1 the low tension stator winding 23 is reversed and included in circuit with the inner armature 2 and the series field 12. Current from the armature 2 flows to contact finger $e$, resting on drum contact $l$ to drum contact $m$, to finger $h$, through stator armature 23, to contact finger $j$, to drum contact $n$, to finger $i$, field coil 12, finger $f$, drum contact $o$, to finger $g$ and back to inner armature 2. For the purpose of illustration we will assume that the hight tension stator winding is wound for the same voltage as the internal armature and that the low tension stator winding is wound for a voltage one-half that of the other. These ratios will be found suitable in many instances although they can be varied to obtain particular torque-speed characteristics. With the above ratios, on step 1, the torque on the armature will be substantially doubled over that supplied by the prime mover for the reason that the armature potential predominates over the stator potential and causes a current therein assisting the forward rotation of the field so that in this instance the field receives one-half of its torque from this stator winding and the other half from the prime mover.

With the controller in position 2 current from armature 2 flows to contact finger $e$, to drum contact $l$, to contact $p$, to finger $i$, to field coil 12, finger $f$, contact $o$, finger $g$ and armature 2. It will be seen that the stator windings are excluded from the armature circuit, the armature and series field alone being in circuit and the field simply clutching the armature and rotating it at nearly its own speed. The power applied to the field element is now directly transferred to the armature, constituting direct drive and the armature having the torque and speed of the driver.

When the controller is moved to position 3 current from stator armature 23 flows to finger $h$, to contact $q$, to finger $i$, thence to field coil 12, finger $f$, contact $o$, finger $g$, armature 2, finger $e$, contact $l$, to contact $r$, and to finger $j$ back to armature 23. The low potential stator winding 23 is again included in the circuit but in a direction to generate a supplemental voltage which causes the armature speed to increase beyond that of the driving field, in this instance one and one-half times that of the field. The driver now expends one-third of its torque on the stator leaving two-thirds available for driving the armature. It will be seen that the quantity of applied power is still the same and that its form only has been changed into higher speed and a correspondingly lighter torque.

As the controller is moved to step 4 current flows from stator armature 22 to finger $k$, to contact $s$, to contact $t$, to finger $i$, to field coil 12, finger $f$, contact $o$, finger $g$, armature 2, finger $e$, contact $u$, finger $d$, back to stator armature 22. The high tension stator winding 22 is substituted for the low tension winding for inclusion into the circuit. The armature speed is increased to double that of the field, the driver torque being evenly divided between the stator and the armature; again the reduced torque on the armature is made up by its greater speed.

The highest speed is reached on step 5 when both stator windings are included in the circuit causing the armature to rotate at two and one-half times that of the field. Current again flows from stator armature 22 to finger $k$, thence to contact $v$, to finger $j$, through stator armature 23, finger $h$, contact $w$, finger $i$, to field coil 12, to finger $f$, contact $o$, finger $g$, inner armature 2, finger $e$, contact $u$, finger $d$, back to stator armature 22.

It is seen that the apparatus has a very great speed torque range, in the present instance 5:1, the torque on 1st speed being 5 times greater than on 5th speed.

As previously mentioned, the apparatus can be driven mechanically by a prime mover or motor, or it may be driven electrically from electric supply mains; referring to Fig. 4, these are represented by 9 and 10 connected to the stator windings 22 and 23; supplying in this instance three-phase alternating current energy, although one, two or other multiphase power can be supplied. An auxiliary battery 44 supplies current to the stator armature and series field with the switch 45 closed and the controller in position S. Current from battery 44 flows through the switch 45, when closed, to finger $i$, field coil 12, finger $f$, contact $x$ where the current divides, a portion flowing to contact $y$, finger $h$, armature 23, finger $j$ back to battery 44. The remainder of the current reaches contact $z$, finger $k$, armature 22, finger $d$, contact $aa$, thence to contact $bb$ and finger $j$ to battery 44. This rotates the field and permits it to be synchronized with the A. C. supply or will start the internal combustion engine in the case of mechanical power. When the field has been synchronized the system receives electric power for driving the field element and operating similarly as before as the controller is shifted to the various operating positions. The A. C. supply 9 delivers a higher voltage to the stator winding 22 than A. C. supply 10 so as to correspond to the different stator potentials. I prefer to supply both stator windings with A. C. current for reason of efficiency which is easily accomplished when the current is drawn from transformers as is generally the case, although the system will operate when only one of the windings is supplied.

It will be noted that in such case my system operates in the triple capacity of generator, motor and convertor; as for instance on step 1 the motor action existing between the field and stator, the field generating electric energy in the armature, a part of which is returned to the stator winding 23 and to the sources of supply 10. On step 3 the source 10 partly drives the field and partly supplies converted current to the armature circuit, the conversion now being from A. C. to D. C. instead of vice versa as on step 1. On step 4 the source 9 supplies converted current to the armature and on step 5 both sources 9 and 10 supply a portion of their converted energy to the armature.

The system is adapted to charge the auxiliary battery 44 which I prefer to connect to one of the stator windings, in this instance, the low potential winding 23. The circuit breaker 46 serves to connect the battery when the proper potential is reached.

Dynamic braking is also provided for, particularly when mechanical power is used to drive the system. The variable resistance 47 connected across the stator winding 23 serves to retard the load when the controller is in the B position. Current in this instance flows from the armature 2 to finger $g$, to contact $m$, to finger $h$, to armature 23, finger $j$, contact $n$, finger $i$, field coil 12, finger $f$, contact $cc$, to finger $e$, back to armature 2. In this position the armature as well as the stator winding is reversed, the armature now rotating the field and supplying current to the stator winding which assists in the rotation of the field and thus prevents shock; then as an increased braking action is desired the resistance 47 is closed across the stator winding, and as the stator winding is increasingly short-circuited the current therein reverses, tending to grip the field; the field in turn retarding rotation of the armature.

The remaining position on the controller is that of R for reverse rotation of the armature, establishing connections so as to include both stator windings in series with the series field, the armature leads being reversed. In this instance current from the stator armature 22 flows to finger $k$, to contact $dd$, to finger $j$, armature 23, finger $h$, contact $ee$, finger $i$, field coil 12, finger $f$, contact $ff$, finger $e$, armature 2 in reverse direction, to finger $g$, contact $gg$, contact $aa$ to finger $d$ back to armature 22. The stator potential so generated is superior to that of the armature in the ratio of 1½ to 1 determining the flow of current through the armature in the reverse direction to that which the rotating field would otherwise generate. It is to be noted that the armature in its backward rotation uses the field element as a fulcrum, assisting the forward rotation of the field and adding to the torque upon the field of the prime mover, the field in turn being retarded to an even greater extent by the stator windings in the ratio of 1½ to 1, resulting in a torque upon the armature twice as great as that supplied by the prime mover. This can be analyzed in the following way: Assuming that the armature exerts a torque of 200 pounds which is also available for assisting the field rotation in a forward direction, the stator windings then exert 1½ times as much or 300 pounds, but in the opposite direction thereby retarding the field, the differenece between the two forces being 100 pounds which must be supplied by the prime mover; the ratio of the supplied torque to that delivered by the armature, therefore, being 1 to 2. An easy method of determining the torque ratio on reverse is to subtract the armature voltage or number of conductors from the total stator voltage or conductors; the ratio of the difference between the two voltages or number of conductors to the armature voltage or conductors will then be as the ratio of the supplied torque to the torque delivered by the armature.

In some instances I have found it desirable to use a shunt winding 48 to obtain an automatically changing field strength that increases with an increasing field speed, and gives to the system a less rigid coupling when driven by an internal combustion engine at low speeds and will prevent the engine from stalling and effect a stiffening of the magnetic coupling as the engine field speed increases with an increase of stator voltage and an increase in the current through the shunt winding. This shunt winding is also helpful when operating from an electric power source and enables one by means of the variable resistance 49 to adjust the power factor of the supply mains as desired so as to draw current from it at unity power factor or assist in energizing the generating equipment.

When my system is supplied with electric energy, I provide for regenerative braking so that the energy of the load can be returned to the source of supply. The control of this braking is facilitated by the use of a variable transformer 11, as indicated in Fig. 5.

In Fig. 5, I have illustrated a modified embodiment of my invention suitable for application where a smaller torque and speed ratio suffices and where reverse rotation is not called for or is brought about by reversing the prime mover. As will be seen the high tension stator winding has been omitted. This embodiment is also very efficient and with the above mentioned winding ratios it has a speed and torque ratio of 1 to 3, it retains steps 1, 2, and 3, has a position S for starting and a position N B for neutral and braking and field rotation by the load, will charge the battery and, like the system heretofore described, can be operated from a source of electric energy alone, from a prime mover supplying mechanical energy alone or from both simultaneously.

In Figs. 8 and 9, I have shown the kind of commutator construction which I preferably employ, comprising the segments 50 separated by the mica plates 51. The mica plates are bent over in back of the segments in order to prevent them from shifting and particularly to keep them from squeezing out and protruding beyond the contact surfaces. The mica ring 52 is inserted between the segments and the split tube 53. This split tube aids greatly in assembling in that it enables the compression ring 54 to be forced over the segments under great pressure without disturbing or injuring the mica insulation. The compression ring is then secured to the armature spider 55. An insulating washer 56 separates the commutator segments from the spider. This commutator assembly while simple is very serviceable, maintaining a smooth contact surface and being well able to withstand the great centrifugal forces developed at the high speeds at which this armature operates. As seen I arrange the commutator assembly within the end connections of the armature winding with a resultant saving of space and it enables me to arrange the rotating brushes within this commutator and near the center of rotation, greatly reducing the centrifugal forces acting on said brushes. The commutators 22 and 23 are similarly made up and, as viewed in Fig. 1, the connecting leads of commutator 22 are arranged on the left and those of commutator 23 are arranged on the right side from where they continue through the commutator supporting casing 57 and then up to the winding.

The rotating brushes are supported by the brush holders 58 (Fig. 2) which in turn are pivoted on pins in the supporting arms 59 cast integral with the brush rings 35. The conducting springs 60 fastened to the ring on one end and to the brushes on the other supply the necessary spring tension to insure brush contact and also conduct the current from the brushes to the rings. All necessary connections between these brush rings and the slip rings are by means of the copper rods 34 which traverse the intervening rings by way of the insulated holes 61 (Fig. 2). This results in an arrangement where all brush rings and connections make up a compact element that can be easily removed and serviced.

The pivoted brush holders 58 are also of special construction and are counterbalanced by means of weights 62 to maintain a substantial uniform contact pressure. They are further so arranged as to compensate for brush wear and to substantially maintain the counterbalancing effect as the brushes wear and become lighter. This is accomplished by shaping the brush holders and pivoting them in such a way so that as the brush wears the brush end of the holder will move outward and the counterweight to move in toward the center of rotation, increasing the force upon the former and decreasing it upon the latter. The counterweight will also swing in an arc under and toward the center of the pivot, still further reducing the effect of the counterweight as the brush wears. It will be seen that by these means any degree of compensation can be secured.

In the selection of the desired speed and torque ratios of the system it should be noted that for the ratios described in connection with Fig. 4, the stator may be provided with as many slots as the armature, each armature slot then to have four conductors and each stator slot six conductors. This arrangement has been shown in Fig. 2, where the armature and stator are each provided with fifty-five slots, this being a suitable number for a six-pole machine and permitting two circuit windings with a full winding pitch of nine. If speed and torque ratios differing from that described are to be obtained it is only necessary to change the number of conductors in series in either the armature or stator, or both.

When the embodiment shown in Fig. 5 is used, the stator need only have two conductors per slot in place of the six shown and the slots consequently may be smaller. The great effectiveness of the system will be appreciated when it is remembered that the mere addition of this small auxiliary winding, having only half as many conductors as the armature, to the field and armature found in ordinary direct current machines, enables my machine to develop a three to one torque and speed ratio.

My system also comprehends forced ventilation and a simple arrangement for filtering the intaken air that increases its capacity and yet keeps it from becoming foul. It consists of the filtering screen 63, which can easily be removed for cleaning, surrounding and spaced from the commutator casing 57. The filtered air entering the casing comes in contact with the commutator leads, and, through passages 64, enters the stationary commutators 22 and 23. It will be noted that the cool incoming air enters a stationary part of the machine which offers little resistance and first of all comes in contact with the commutators, leads and brushes which are most in need of cooling. Thereafter, a portion of it is forced out by reason of the rotating flange 37 around the right side of the stator winding and out through the opening 65. The other portion of the air continues inside of the armature commutator and past the brushes 28 through the armature spider where a portion again passes out of the opening 66 after traversing the armature fields and stator cores. The remaining portion continues along the armature spider and is impelled by the vanes 67 past the armature winding and is still further impelled by the vanes 68 or the field spider 17 past the stator winding and through the openings 69.

It is obvious that various modifications may be made in the construction shown in the drawings and above particularly described within the principle and scope of my invention.

I claim:

1. An electromagnetic system comprising a rotative field member, a stator having a low potential winding connected to a commutator, and a high potential winding connected to a commutator, a rotative armature having a winding and a commutator connected thereto, and means for connecting the low potential stator winding into the armature circuit for one stage and for connecting the high potential winding into the armature circuit for another stage.

2. An electromagnetic system comprising a rotative field member, a stator having a low potential winding and a high potential winding, each connected to a commutator, a rotative armature having a winding and a commutator therefor, controller means operative in one position to connect the armature winding in circuit with one of the stator windings and in another position to connect the armature winding in series with both stator windings.

3. An electromagnetic system comprising a rotative field member, a stator having a low potential winding and a high potential winding, each connected to a commutator, a rotative armature having a winding connected to a commutator, and controller means operative in one position for connecting the armature winding in circuit with both stator windings and in a forward direction with respect to the field coil, and in another position to connect the armature winding in circuit with the two stator windings in a reverse direction with respect to the field coil.

4. An electromagnetic system comprising a rotative field member, a rotatable element provided with coils and a stator element provided with coils, the coils of both elements being in inductive relation to the field coil and those on one element being connected into a winding and those on the other element being connected into two independent windings, and a commutator for each of the three windings.

5. An electromagnetic driving system comprising a rotative field member having a field coil, a stator armature having a winding connected to a commutator, a rotative armature having a winding and a commutator connected thereto, connections between the armatures and field coil for varying the magnetomotive force in the field coil in proportion to the current in the armatures, and controlling means operative in one stage to connect the stator armature in a reverse direction with respect to the rotatable armature and the field coil for increasing the armature torque and in another stage to connect the stator armature in a forward direction with respect to the rotatable armature and the field coils to increase the armature speed above that of the field member.

6. An electromagnetic driving system comprising a rotative field member, a stator having a low potential winding and a high potential winding each connected to a commutator, a rotative armature having a winding and a commutator connected thereto, the stator and armature windings being adapted to be variously connected with respect to the field coil to form a circuit, a storage battery, and means for connecting it across the low potential winding.

7. An electromagnetic driving system comprising a rotative field member, a stator having a low potential winding and a high potential winding each connected to a commutator, and a rotative armature having a winding and a commutator connected thereto, the stator and armature windings being adapted to be variously connected with respect to the field coil to form a circuit.

8. An electromagnetic driving system comprising a rotative field member including a field coil, a stator armature having a winding connected to a commutator, a rotative armature having a winding and a commutator connected thereto, connectors between armatures and field coil operative to vary the magnetomotive force in said field coil in proportion to the armature current, and controller means operative in one position to connect the stator winding in a reverse direction to the armature winding with respect to the field coil for increasing the armature torque, in another position to connect the armature winding directly to the field coil to the exclusion of the stator winding, and in another position to connect the stator winding to the armature winding in a forward direction with respect to the field coil for increasing the armature speed above that of the field member.

9. An electromagnetic driving system comprising a rotative field member, a stator having a low potential winding and a high potential winding each connected to a commutator, an armature having a winding and a commutator connected thereto, the stator and armature windings being adapted to be variously connected with respect to the field coil to form a circuit, and controller means operative in one position to connect one of the stator windings in a forward direction with respect to field coil in circuit with the armature winding for increasing the armature speed above that of the field member and in another position for connecting both stator windings in circuit with the armature winding for still further increasing the armature speed.

10. An electromagnetic power transmission device comprising a rotative field member, a stator facing the field member on one side and having a low potential winding connected to a commutator and a high potential winding connected to a commutator inductively related to the field coil, a driven rotative armature including a commutator facing the other side of the field member and having its winding inductively related thereto, the stator windings and the armature winding being adapted to be variously connected with respect to the field to form a circuit, and controlling means operative in one position to connect the armature winding in series with the field coil to the exclusion of both stator windings, in another position to connect the armature winding in series with the field coils and the low potential stator winding to the exclusion of the high potential stator winding, and in another position to connect the armature winding in series with the field coils and in series with both stator windings.

11. An electromagnetic power transmission device comprising a driving rotating field member, a stator facing the field member on one side and having a low potential winding and a high potential winding inductively related to the field, a driven rotative armature facing the other side of the field member and having its winding inductively related thereto, two stationary commutators connected to the respective stator windings, a commutator carried by the armature and connected to the armature winding and three sets of brushes carried by the field member for wiping the respective commutators.

12. A dynamo electric machine comprising a rotative field member, a stator armature facing the field member on one side and a rotative armature facing it on the other side, the three members being so related that a common flux from the field member cuts both windings, the stator armature having two independent windings of different voltage capacities, the field member including a series winding adapted to be connected in series with the rotative armature winding and a shunt winding adapted to be connected in shunt with one of the stator armature windings, and means including commutators and brushes for connecting the rotatable armature winding with either one or both of the stator armature windings.

13. A dynamo electric machine comprising a rotatable field member including a shunt winding, a rotatable armature including a winding and commutator, a stator armature including a winding and commutator, a controller for connecting the stator armature in circuit with the rotatable armature in one stage in a forward direction with respect to the field coil and in another stage in a reverse direction, and connections operative to vary the current in the field coil in proportion to the voltage of the stationary armature in one stage and in proportion to the voltage of the rotatable armature in another stage.

14. A dynamo electric machine comprising a rotative field member, a stator armature facing the field member on one side and a rotative armature facing it on the other side, the three members being so related that a common flux from the field member cuts both windings, the stator armature having two independent windings of different voltage capacities, the field member including a series winding adapted to be connected in series with the rotative armature winding and a shunt winding adapted to be connected in shunt with one of the stator armature windings, and a variable resistance in the shunt winding.

15. An electromagnetic system comprising a rotative field member, a stator having a winding connected to a commutator, a rotative armature having a winding connected to a commutator, and a controller for variously connecting the windings in circuit and operative in one position to connect the armature winding in the circuit in a reverse direction with respect to the field coil and to connect the stator winding also in a reverse direction with respect to the field coil, and a resistance connected across the stator winding operative to retard rotation of the field member.

16. In combination, a prime mover, a load shaft and an electromagnetic driving system including an armature for driving the load shaft, a series field coil inductively related to said armature and rotated by said prime mover for a direct transfer of mechanical power to the load shaft, a second armature adapted to cooperate with the prime mover for an interchange of mechanical energy therebetween, a shunt field coil inductively related to the second armature, means for varying the current in said series field coil substantially in proportion to the current in the armatures and means for impressing the shunt coil with the voltage of the first armature when prime mover speed exceeds load speed and with the voltage of the second armature when load speed exceeds prime mover speed.

In witness whereof, I hereunto subscribe my signature.

ALFONS H. NEULAND.